(12) United States Patent
Aoki

(10) Patent No.: US 9,208,391 B2
(45) Date of Patent: Dec. 8, 2015

(54) BIOMETRIC AUTHENTICATION DEVICE, BIOMETRIC AUTHENTICATION METHOD, AND COMPUTER READABLE, NON-TRANSITORY MEDIUM

(71) Applicant: FUJITSU LIMITED, Kawasaki-shi, Kanagawa (JP)

(72) Inventor: Takahiro Aoki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/494,944

(22) Filed: Sep. 24, 2014

(65) Prior Publication Data

US 2015/0010217 A1    Jan. 8, 2015

Related U.S. Application Data

(63) Continuation of application No. PCT/JP2012/058169, filed on Mar. 28, 2012.

(51) Int. Cl.
*G06K 9/00* (2006.01)
*G06K 9/03* (2006.01)

(52) U.S. Cl.
CPC ........ *G06K 9/00892* (2013.01); *G06K 9/00006* (2013.01); *G06K 9/036* (2013.01)

(58) Field of Classification Search
CPC .................. G06K 2009/3291; G06K 9/00006; G06K 9/00335; G06K 9/00885; G06K 9/00892
USPC .......................................... 382/115; 713/186
See application file for complete search history.

(56) References Cited

U.S. PATENT DOCUMENTS

| 2006/0078177 A1 | 4/2006 | Niinuma et al. |
| 2006/0120577 A1 | 6/2006 | Shinzaki et al. |
| 2008/0177994 A1* | 7/2008 | Mayer ............................... 713/2 |
| 2012/0082348 A1* | 4/2012 | Fukuda et al. ................. 382/115 |

(Continued)

FOREIGN PATENT DOCUMENTS

| JP | 2001-14462 | 1/2001 |
| JP | 2001-84371 | 3/2001 |
| JP | 2002-514098 | 5/2002 |

(Continued)

OTHER PUBLICATIONS

"Goh Kah Ong Michael, Tee Connie and Andrew Beng Jin Teoh", "A Contactless Biometric System Using Palm Print and Palm Vein Features",Aug. 9, 2011, inTech.*

(Continued)

*Primary Examiner* — Samir Ahmed
*Assistant Examiner* — Shaghayegh Azima
(74) *Attorney, Agent, or Firm* — Staas & Halsey LLP

(57) ABSTRACT

A biometric authentication device includes: a first biometric sensor that obtains biometric information of a user; a second biometric sensor that obtains biometric information of a user at a lower degree of reproducibility than the first biometric sensor; an authentication process unit that performs an authentication by comparing with use of the biometric information obtained by the first biometric sensor and the second biometric sensor, wherein the authentication process unit compares biometric information obtained by the second biometric sensor with use of biometric information obtained by the first biometric sensor of a case where a comparing between the biometric information obtained by the first biometric sensor and enrolled information is successful.

7 Claims, 16 Drawing Sheets

(56) References Cited

U.S. PATENT DOCUMENTS

2012/0250954 A1* 10/2012 Nada et al. .................. 382/124
2014/0112550 A1* 4/2014 Hanna ......................... 382/117

FOREIGN PATENT DOCUMENTS

| JP | 2002-200050 | 7/2002 |
| JP | 2004-21491 | 1/2004 |
| JP | 2006-107340 | 4/2006 |
| JP | 2009-169796 | 7/2009 |
| WO | WO 98/08439 | 3/1998 |

OTHER PUBLICATIONS

International Search Report mailed Jun. 26, 2012, in corresponding International Patent Application No. PCT/JP2012/058169.
Extended European Search Report dated May 27, 2015 in corresponding European Patent Application No. 12873357.3.
Niinuma et al., "Soft Biometric Traits for Continuous User Authentication", IEEE Transactions on Information Forensics and Security, vol. 5, No. 4, Dec. 2010, pp. 771-780.
Morales et al., "On the Feasibility of Interoperable Schemes in Hand Biometrics", Sensors, 2012, 12, pp. 1352-1382.
Marcialis et al., "Serial fusion of multi-modal biometric systems", IEEE, 2010, 7 pp.
Michael et al., "A Contactless Biometric System Using Palm Print and Palm Vein Features", Advanced Biometric Technologies, 2011, pp. 155-178.
Jain et al., "Biometrics of Next Generation: An Overview", Second Generation Biometrics, Springer, 2010, 36 pp.

* cited by examiner

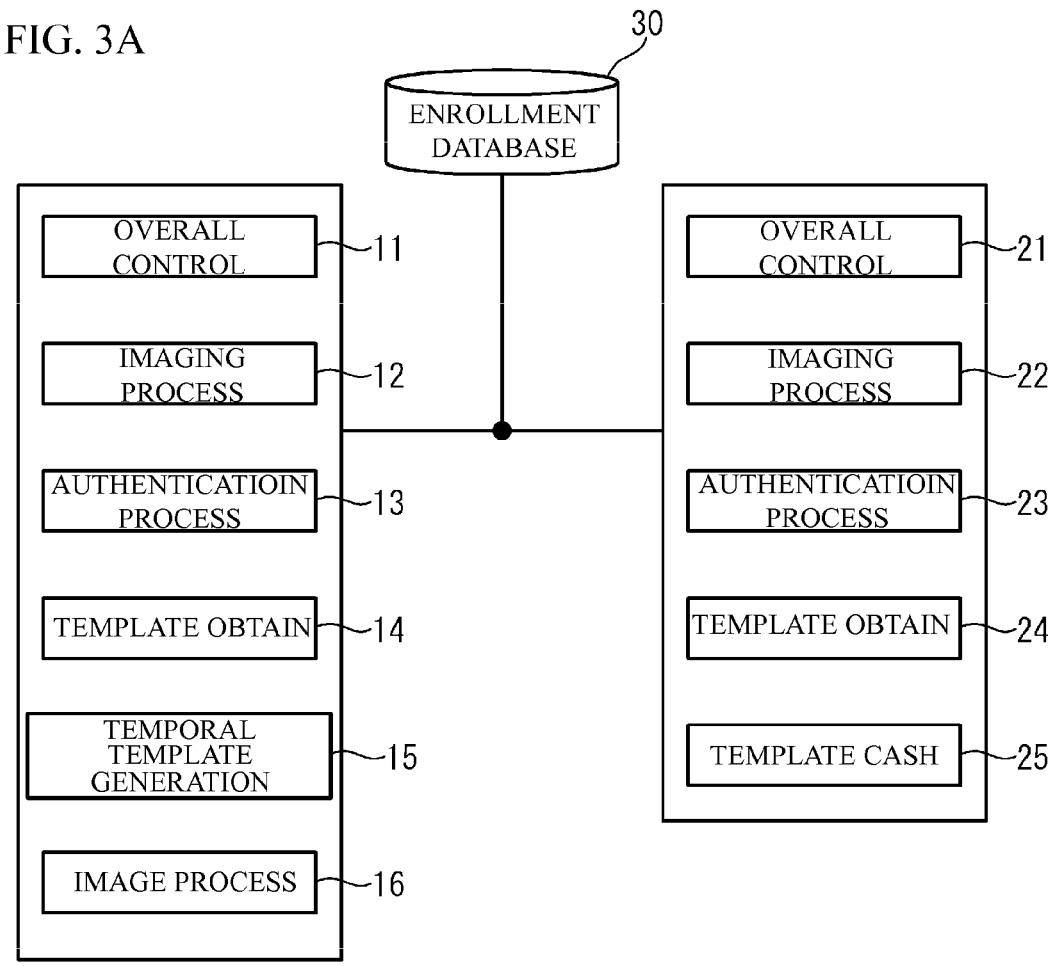

BIOMETRIC AUTHENTICATION DEVICE, BIOMETRIC AUTHENTICATION METHOD, AND COMPUTER READABLE, NON-TRANSITORY MEDIUM

This application is a continuation application of International Application PCT/JP2012/058169 filed on Mar. 28, 2012 and designated the U.S., the entire contents of which are incorporated herein by reference.

FIELD

A certain aspect of the embodiments is related to a biometric authentication device, a biometric authentication method and a computer-readable, non-transitory medium.

BACKGROUND

A biometric authentication is performed by comparing a comparison-use data obtained by a biometric sensor and an enrolled data enrolled in a database. Recently, the biometric authentication is diversified. Patent Documents 1 to 3 disclose a technology of the diversified biometric authentications.

PRIOR ART DOCUMENT

Patent Document

Patent Document 1: Japanese Laid-open Patent Publication No. 2001-14462
Patent Document 2: Japanese Laid-open Patent Publication No. 2006-107340
Patent Document 3: Japanese Laid-open Patent Publication No. 2009-169796

SUMMARY

According to an aspect of the present invention, there is provided a biometric authentication device including: a first biometric sensor that obtains biometric information of a user; a second biometric sensor that obtains biometric information of a user at a lower degree of reproducibility than the first biometric sensor; an authentication process unit that performs an authentication by comparing with use of the biometric information obtained by the first biometric sensor and the second biometric sensor, wherein the authentication process unit compares biometric information obtained by the second biometric sensor with use of biometric information obtained by the first biometric sensor of a case where a comparing between the biometric information obtained by the first biometric sensor and enrolled information is successful.

According to an aspect of the present invention, there is provided a biometric authentication method including: performing an authentication by comparing biometric information obtained by a first biometric sensor that obtains biometric information of a user and an enrolled information; and with use of the biometric information of a case where the comparing is successful, performing an authentication by comparing biometric information obtained by a second biometric sensor that obtains biometric information of a user at a lower degree of reproducibility than the first biometric sensor.

According to an aspect of the present invention, there is provided a computer readable, non-transitory medium storing a program that causes a computer to execute a process, the process including: performing an authentication by comparing biometric information obtained by a first biometric sensor that obtains biometric information of a user and an enrolled information; and with use of the biometric information of a case where the comparing is successful, performing an authentication by comparing biometric information obtained by a second biometric sensor that obtains biometric information of a user at a lower degree of reproducibility than the first biometric sensor.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3A illustrates a block diagram of each function realized by an execution of a biometric authentication program;

FIG. 3B illustrates a table example showing an enrolled template enrolled in an enrollment database;

DESCRIPTION OF EMBODIMENTS

Figure 1:
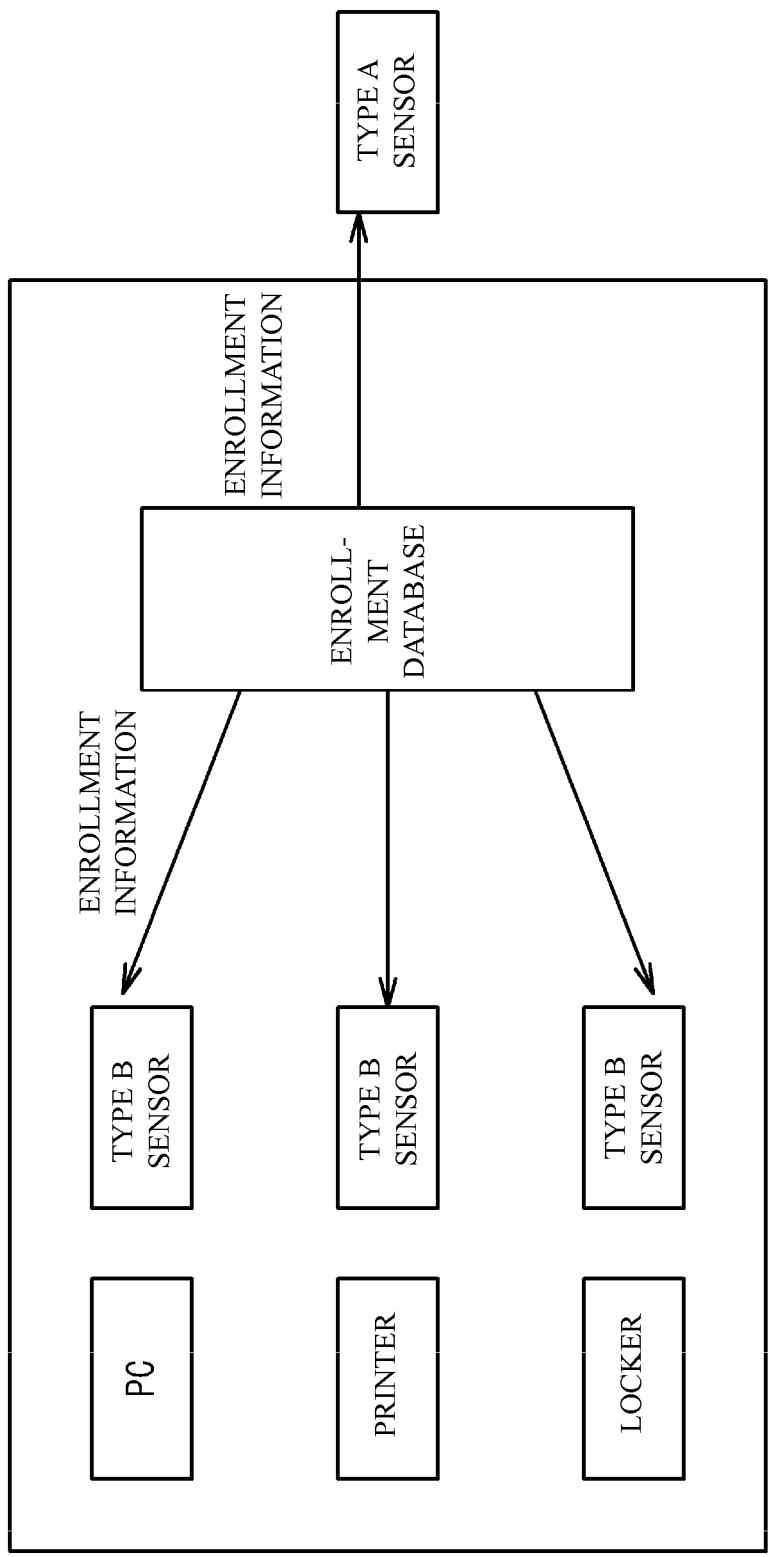
FIG. 1 is a drawing for describing a situation example where embodiments are applied.

A description will be given of a situation example where the following embodiments are applied, before describing the embodiments. FIG. 1 is a drawing for describing the situation example where the following embodiments are applied. With reference to FIG. 1, a sensor for administration of entering or leaving a room (type A sensor) and a sensor for administration of log-on of a PC in an office, administration of door lock or the like (type B sensor) are provided. A biometric authentication is performed by comparing biometric information obtained by a biometric sensor and enrolled information enrolled in an enrollment database.

The administration of entering or leaving a room is a first stage of a security. Therefore, high accuracy authentication is required for the type A sensor. And so, a sensor that has high authentication accuracy and high resistance against outer light but is large and expensive is used as the type A sensor. On the other hand, a sensor used in each desktop PC or note PC in an office has a limit in size. The number of the PCs is large. Therefore, cost cut is required. And so, a small and inexpensive sensor is used as the type B sensor. In this case, authentication accuracy in the office is degraded. It is demanded that the authentication accuracy of the type B sensor is improved. And so, in the following embodiments, a description will be given of a biometric authentication device, a biometric authentication method and a biometric authentication program that are capable of suppressing degradation of authentication accuracy in a case where a plurality of sensors are used.

First Embodiment

Figure 2A:
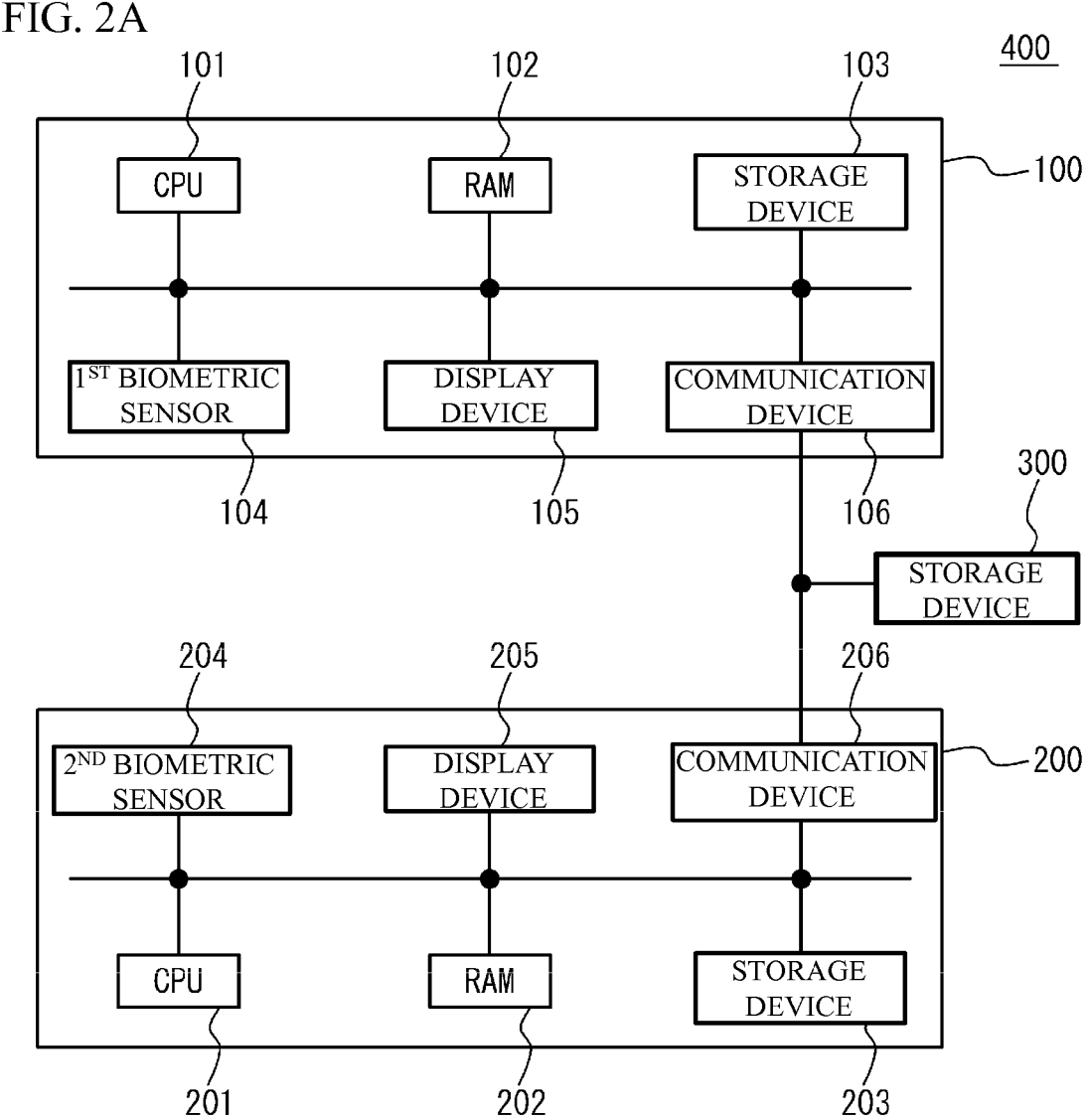
FIG. 2A illustrates a block diagram for describing a hardware structure of a biometric authentication device in accordance with a first embodiment.

FIG. 2A illustrates a block diagram for describing a hardware structure of a biometric authentication device 400 in accordance with a first embodiment. With reference to FIG. 2A, the biometric authentication device 400 has a structure in which a terminal 100, a terminal 200 and a storage device 300 are coupled with each other via a network. A communication network such as an intranet, a public line network or internet may be used as the network. For example, the terminal 100 is a device to determine allowing of entering an office. The terminal 100 is a PC terminal provided in the office.

The terminal 100 has a CPU 101, a RAM 102, a storage device 103, a first biometric sensor 104, a display device 105, a communication device 106 and so on. These components are coupled with each other via a bus or the like. The terminal 200 has a CPU 201, a RAM 202, a storage device 203, a second biometric sensor 204, a display device 205, a communication device 206 and so on. These components are coupled with each other via a bus or the like.

The CPUs (Central Processing Unit) 101 and 201 are central processing units. The CPUs 101 and 201 include one or more core. The RAM (Random Access Memory) 102 is a volatile memory temporally storing a program executed by the CPU 101, a data processed by the CPU 101, and so on. The RAM 202 is a volatile memory temporally storing a program executed by the CPU 201, a data processed by the CPU 201, and so on.

The storage devices 103 and 203 are nonvolatile memory devices. The storage devices 103 and 203 may be SSDs (Solid State Drive) such as ROMs (Read Only Memory) or flash memories, or hard disks driven by hard disk drives. The display device 105 is a device for showing a result of each process of the terminal 100. The display device 205 is a device for showing a result of each process of the terminal 200. The display devices 105 and 205 are liquid crystal displays or the like. The communication devices 106 and 206 are interfaces for transmitting and receiving a signal with an outer component.

Figure 2B:
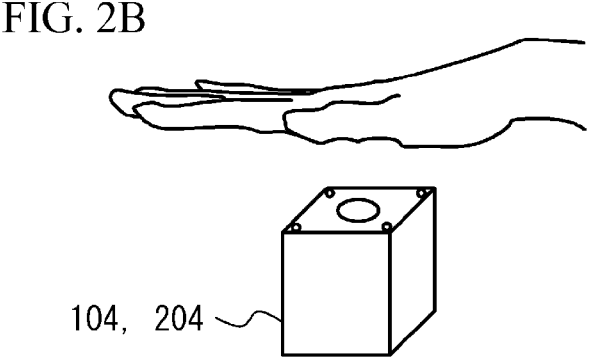
FIG. 2B illustrates a schematic view for describing an example of a biometric sensor to detect a palm vein.

The first biometric sensor 104 and the second biometric sensor 204 are sensors to obtain biometric information of a user. The biometric information of a user is not limited, and is information of a biometric body such as a fingerprint, a vein, an iris, a voiceprint or a shape. In the embodiment, a sensor to detect an image of a palm vein is used as the first biometric sensor 104 and the second biometric sensor 204, as an example. FIG. 2B illustrates a schematic view for describing the first biometric sensor 104 to detect a palm vein.

The first biometric sensor 104 is an imaging device to take an image of a vein under a palm skin with use of a near-infrared ray having high permeability with respect to a human body. The first biometric sensor 104 has a CMOS (Complementary Metal Oxide Semiconductor) camera or the like. An illumination to radiate a light including a near-infrared ray may be provided. The second biometric sensor 204 has the same structure as the first biometric sensor 104.

The first biometric sensor 104 has higher reproducibility than the second biometric sensor 204 with respect to obtaining biometric information of a user. That is, a similarity among biometric information obtained by the first biometric sensor 104 two or more times is higher than a similarity among biometric information obtained by the second biometric sensor 204 two or more times. When the first biometric sensor 104 and the second biometric sensor 204 are sensors to obtain a biometric image, the first biometric sensor 104 has a device structure to achieve higher image quality than the second biometric sensor 204.

A description will be given of high image quality and low image quality. In the embodiment, image quality satisfying the following requirements is referred to as high image quality. Image quality not satisfying the following requirements is referred to as low image quality. In concrete, image quality having less noise may be referred to as high image quality. When there is less noise, it is possible to stably extract an authentication feature and authentication accuracy gets higher. A noise of an image is determined by light amount of a light source or performance of a lens. For example, when the light amount is large, the noise decreases. F value that is an index indicating brightness may be used as the performance of a lens.

Image quality of which limb darkening is small may be referred to as high image quality. This is because when the limb darkening is small, feature of an edge of a taken image can be extracted stably. And, authentication accuracy is improved because cut-out process of a portion for authentication is stabilized. The cut-out process is, for example, a process of cutting out a palm region that is an authentication object from an image. The limb darkening is determined by characteristic of a lens, evenness of illuminations and so on.

Image quality of which resolution is high may be referred to as high image quality. This is because when a resolution of an image is high, an image of a fine feature can be taken and the authentication accuracy is improved. Resolution of an image is determined by a performance of an imaging element (CMOS or CCD), a performance of transmission path (for example, forwarding performance of USB) and so on. With respect to the performance of transmission path, this is because when capacity of a transmission path is small, it is difficult to actually use the transmission path because a high resolution data generally has a large data capacity even if the high resolution data can be obtained with use of an imaging element.

Image quality having high resolving power may be referred to as high image quality. The resolving power is an index indicating distinguishability of small information and is, for example, an index of determining whether a fine line pair is correctly identified as a line pair when an image of a white line and a black line is taken. In concrete, when the resolving power is low, the white and the black are mixed, and appear in gray. The resolving power is determined by a performance of a lens together with the resolution. The MTF (Modulation Transfer Function) may be used as the index of the resolving power.

Image quality having less surface reflection may be referred to as high image quality. This is because when an amount of the surface reflection is small, it is possible to clearly take an image of a vein image that is an inner feature and the authentication accuracy is improved. A surface reflection component is a reflection component occurring at an interface between a palm and air. The surface reflection can be reduced when a polarization board is mounted. The surface reflection can be reduced by an arrangement of a light source and an illuminating method.

The storage device 300 is a nonvolatile memory device. The storage device 300 may be an SSD (Solid State Drive) such as a ROM (Read Only Memory) or a flash memory, or a hard disk driven by a hard disk drive. A biometric authentication program is stored in the storage device 300. The biometric authentication program may be divided into and stored by the storage devices 103 and 203.

Next, a description will be given of each process of the terminal 100. The biometric authentication program stored in the storage device 300 is developed to the RAMs 102 and 202. The CPU 101 executes the biometric authentication program developed to the RAM 102. The CPU 201 executes the biometric authentication program developed to the RAM 202. Thus, each process of the terminal 100 is performed.

FIG. 3A illustrates a block diagram of each function realized by the execution of the biometric authentication program. With reference to FIG. 3A, by the execution of the biometric authentication program, the terminal 100 acts as an overall control unit 11, an imaging process unit 12, an authentication process unit 13, a template obtain unit 14, a temporal template generation unit 15 and an image process unit 16. By the execution of the biometric authentication program, the terminal 200 acts as an overall control unit 21, an imaging process unit 22, an authentication process unit 23, a template obtain unit 24 and a template cash unit 25. And, by the execution of the biometric authentication program, the storage device 300 acts as an enrollment database 30.

The overall control unit 11 controls the imaging process unit 12, the authentication process unit 13, the template obtain unit 14, the temporal template generation unit 15 and the image process unit 16. The imaging process unit 12 obtains a palm image from the first biometric sensor 104 in accordance with an instruction of the overall control unit 11. The authentication process unit 13 extracts palm vein information from the palm image obtained by the imaging process unit 12 as an authentication feature in accordance with an instruction of the overall control unit 11, and performs an authentication process. The template obtain unit 14 obtains an enrolled template (enrolled data) from the enrollment database 30 for authentication of the authentication process unit 13. The temporal template generation unit 15 generates a temporal template from the authentication feature extracted by the authentication process unit 13. The image process unit 16 processes the image obtained by the imaging process unit 12.

The overall control unit 21 controls the imaging process unit 22, the authentication process unit 23, the template obtain unit 24 and the template cash unit 25. The imaging process unit 22 obtains a palm image from the second biometric sensor 204 in accordance with an instruction of the overall control unit 21. The authentication process unit 23 extracts palm vein information from the palm image obtained by the imaging process unit 22 as an authentication feature in accordance with an instruction of the overall control unit 21, and performs an authentication process. The template obtain unit 24 obtains an enrolled template (enrolled data) from the enrollment database 30 for authentication of the authentication process unit 23. The template cash unit 25 temporarily stores a temporal template generated by the temporal template generation unit 15.

FIG. 3B illustrates a table example showing an enrolled template enrolled in the enrollment database 30. With reference to FIG. 3B, the enrolled template includes an authentication feature related to an ID of each user. The enrolled template may be enrolled in the enrollment database 30 in advance with use of the first biometric sensor 104. A description will be given of details of the authentication process.

[Authentication Process]

Figure 4:
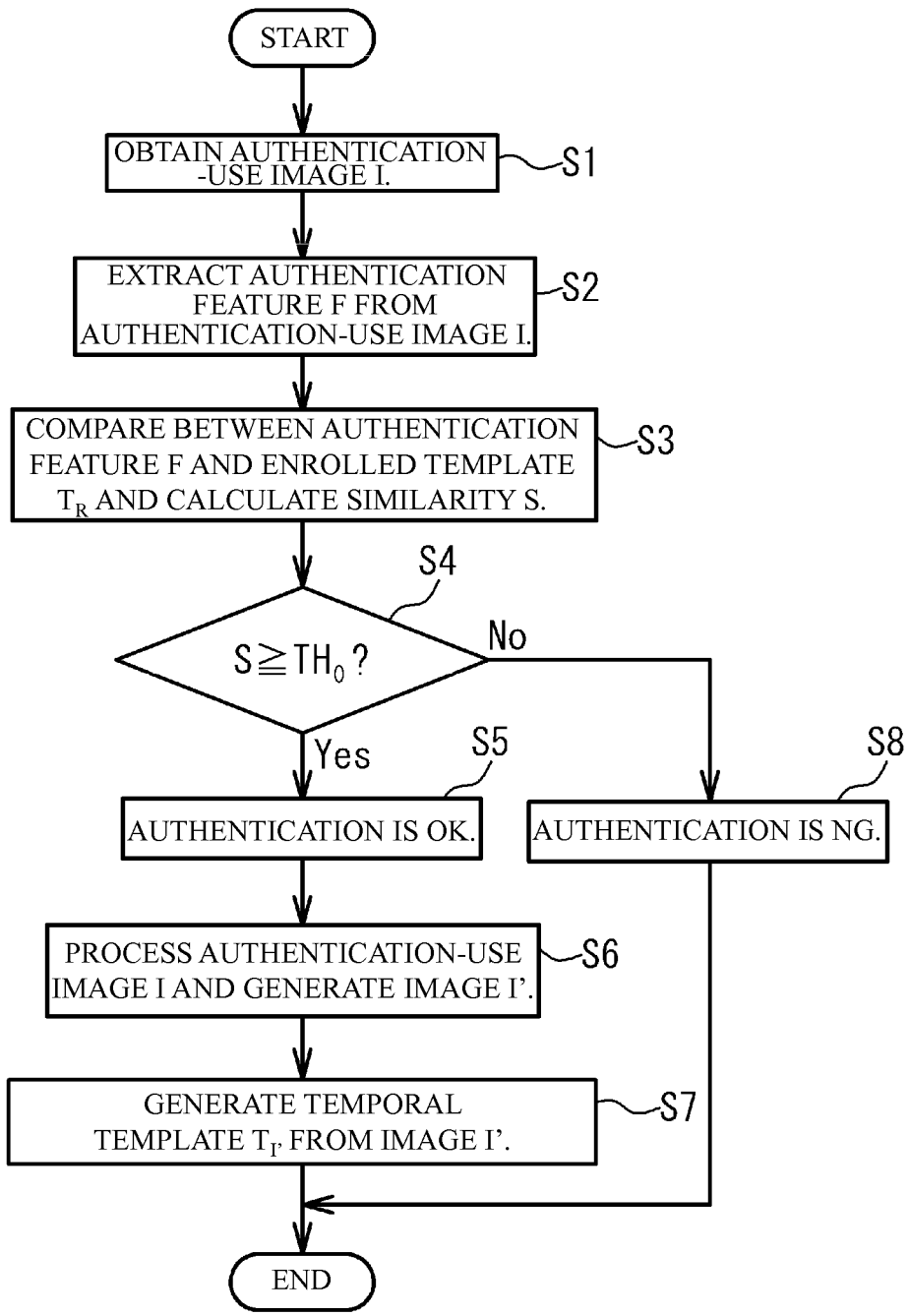
FIG. 4 illustrates an example of a flowchart executed during an authentication process with use of at biometric sensor.

FIG. 4 illustrates an example of a flowchart executed during the authentication process with use of the first biometric sensor 104. For example, the authentication process is executed during entering an office. The imaging process unit 12 obtains an authentication-use palm image I from the first biometric sensor 104 (Step S1). Next, the authentication process unit 13 extracts an authentication feature F from the palm image I (Step S2). Next, the authentication process unit 13 compares between the authentication feature F and an enrolled template TR which the template obtain unit 14 obtains from the enrollment database 30, and calculates a similarity S of the both (Step S3). The authentication process unit 13 calculates a similarity between enrolled templates (TR1 to TRN) of each user and the authentication feature F.

Next, the authentication process unit 13 determines whether a similarity S of one of users is equal to or more than a threshold TH0 (Step S4). When it is determined as "Yes" in the Step S4, the authentication process unit 13 outputs a signal indicating that the authentication is successful (Step S5). Thus, for example, a door for entering the office is opened. Next, the image process unit 16 generates an image I' having lower image quality than the image I by processing the palm image I allowing the success of the authentication (Step S6).

Here, a description will be given of an example of the generation of the image I' having low image quality. For example, when the second biometric sensor 204 of which reproducibility is low is used, there may be case where a sufficient illumination amount is not achieved. For example, when the second biometric sensor 204 is built in the note PC, it is necessary to reduce light amount in view of power consumption. As a result of the reduction of the light amount, many noises are included in an image. There may be a case where an imaging element (CCD or CMOS) used for obtaining an image is downsized. When an area of the imaging element is small, a light amount per a unit area is reduced. This results in increase of the noise. A small imaging element is often used in a small and inexpensive sensor. As a result, the noise tends to increase.

When the noise is included in the image, extraction of a feature amount (a ridge line of a fingerprint or a vein pattern) is unstable. And so, the image process unit 16 may add a noise to an image obtained by the first biometric sensor 104 in order to reduce a difference between image quality of the image obtained by the first biometric sensor 104 and image quality of an image obtained by the second biometric sensor 204. For example, the image process unit 16 measures an amount σ of a noise indicating a difference between the sensors in advance, and adds a random noise determined based on the σ to pixels of the palm image I. In concrete, the image process unit 16 obtains an image I' in accordance with the following formula (1). In the following formula (1), I'(x) is the image I' after the process. I(x) is the palm image I before the process. N(x) is a noise (average=0).

$$I'(x) = I(x) + N(x) \tag{1}$$

Figure 5:
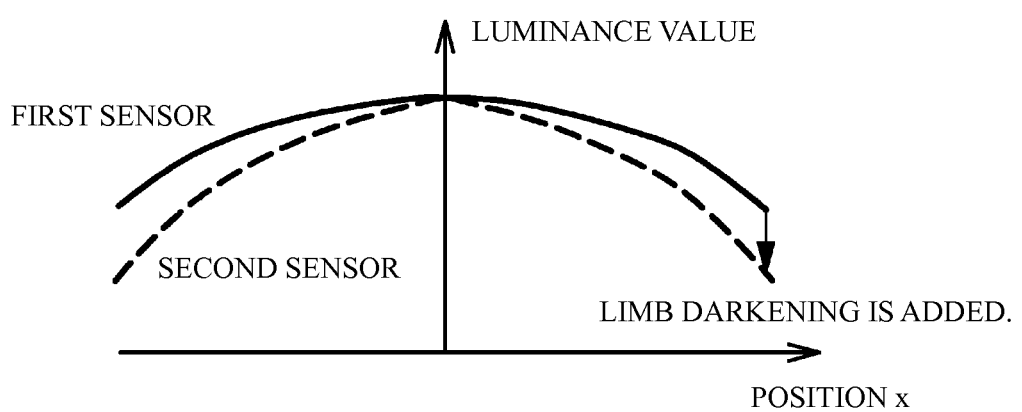
FIG. 5 illustrates an example of generation of an image having low image quality.

FIG. 5 illustrates another example of the generation of the image I' having low image quality. For example, when a small sensor is used as the second biometric sensor 204, a sensor area is small. Therefore, there may be a case where a radiation area of a light source is limited. When the sensor area is small, it is difficult to evenly radiate a light to a subject such as a palm. In this case, when limb darkening is added to an image obtained by the first biometric sensor 104, a difference between image quality of the image obtained by the first biometric sensor 104 and image quality of an image obtained by the second biometric sensor 204 can be reduced. For example, with reference to FIG. 5, the image process unit 16 obtains a limb darkening conversion curve indicating a difference between distribution of luminance values of the image obtained by the first biometric sensor 104 and distribution of luminance values of the image obtained by the second biometric sensor 204 in advance. Further, the image process unit 16 generates the image I' having low image quality by applying the limb darkening curve to the image obtained by the first biometric sensor 104. Thus, the difference between the image quality of the image obtained by the first biometric sensor 104 and the image quality of the image obtained by the second biometric sensor 204 is reduced. In concrete, the image process unit 16 obtains the image I' in accordance with the following formula (2). In the following formula (2), I'(x) is the image I' after the process. I(x) is the palm image I before the process. a(x) is a limb darkening curve (a(0)=1.0)

$$I'(x) = a(x) \cdot I(x) \quad (2)$$

Figure 6:
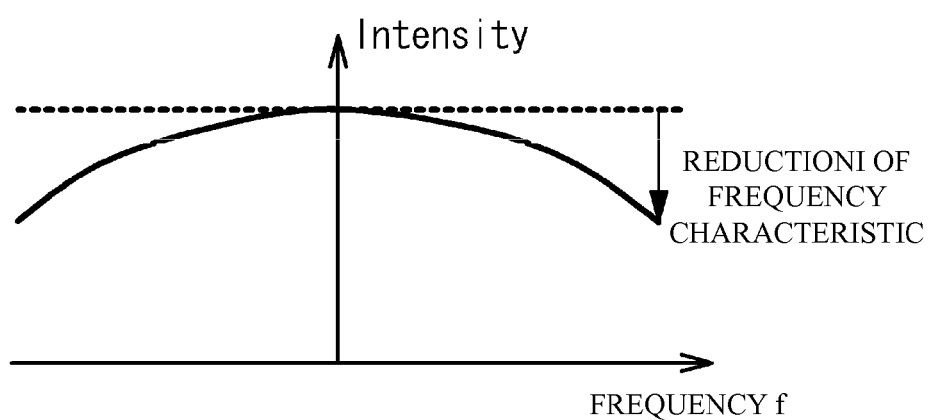
FIG. 6 illustrates another example of generation of an image having low image quality.

FIG. 6 illustrates another example of the generation of the image I' having low image quality. For example, when an inexpensive sensor is used as the second biometric sensor 204, the number of lenses, the thickness of the lenses are limited. Optical characteristic is degraded according to a material of the lenses. In this case, a sharpness degree (frequency) of the image obtained by the second biometric sensor 204 is degraded. The sharpness degree can be expressed with use of MTF value. The MTF value is a value in which degradation degree of an original image caused by a lens is expressed by a frequency region. In this case, when the frequency characteristic of the image obtained by the first biometric sensor 104 is degraded, the difference between the image quality of the image obtained by the first biometric sensor 104 and the image quality of the image obtained by the second biometric sensor 204 can be reduced. In concrete, with reference to FIG. 6, the image process unit 16 obtains a "frequency degradation curve" matching frequency characteristics of sensors in advance, and changes the frequency characteristics in accordance with the frequency degradation curve. In concrete, the image process unit 16 obtains the image I' in accordance with the following formula (3). In the following formula (3), F'(f) is Fourier transform of the image I' after the process. F(f) is Fourier transform of the palm image I before the process. a(f) is the frequency degradation curve.

$$F'(f) = a(f) \cdot F(f) \quad (3)$$

A distortion of a lens may be used as an image process for reducing the difference between lenses. In this case, when the image process unit 16 adds a lens distortion to the palm image I obtained by the first biometric sensor 104, the difference between the image quality of the image obtained by the first biometric sensor 104 and the image quality of the image obtained by the second biometric sensor 204 can be reduced.

Figure 7:
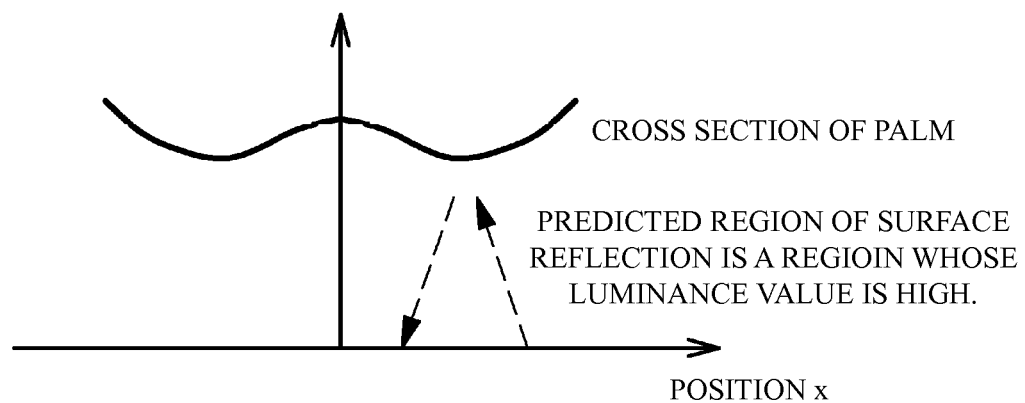
FIG. 7 illustrates another example of generation of an image having low image quality.

FIG. 7 illustrates another example of the generation of the image I' having low image quality. For example, when a high frequency noise is added to a region of the palm image obtained by the second biometric sensor 204 in which luminance values are high, the difference between the image quality of the image obtained by the first biometric sensor 104 and the image quality of the image obtained by the second biometric sensor 204 can be reduced. Surface reflection is likely to occur in a convex region of a palm with reference to FIG. 7 because an incident angle is equal to a reflection angle. In the region, an average luminance value is high. It is therefore possible to predict the occurrence of the surface reflection with use of the luminance value as a reference. In the region with the surface reflection, a noise of high frequency occurs because of wrinkles of a surface. Therefore, the image process unit 16 may perform a process of adding a high frequency noise to the region.

With reference to FIG. 4 again, the authentication process unit 13 extracts an authentication feature from the image I', and the temporal template generation unit 15 transmits the authentication feature to the template cash unit 25 as a temporal template TI' (Step S7). When it is determined as "No" in the Step S4, the authentication process unit 13 outputs a signal indicating that the authentication is failed (Step S8). After the Step S7 or the Step S8, the flowchart of FIG. 4 is terminated.

Figure 8:
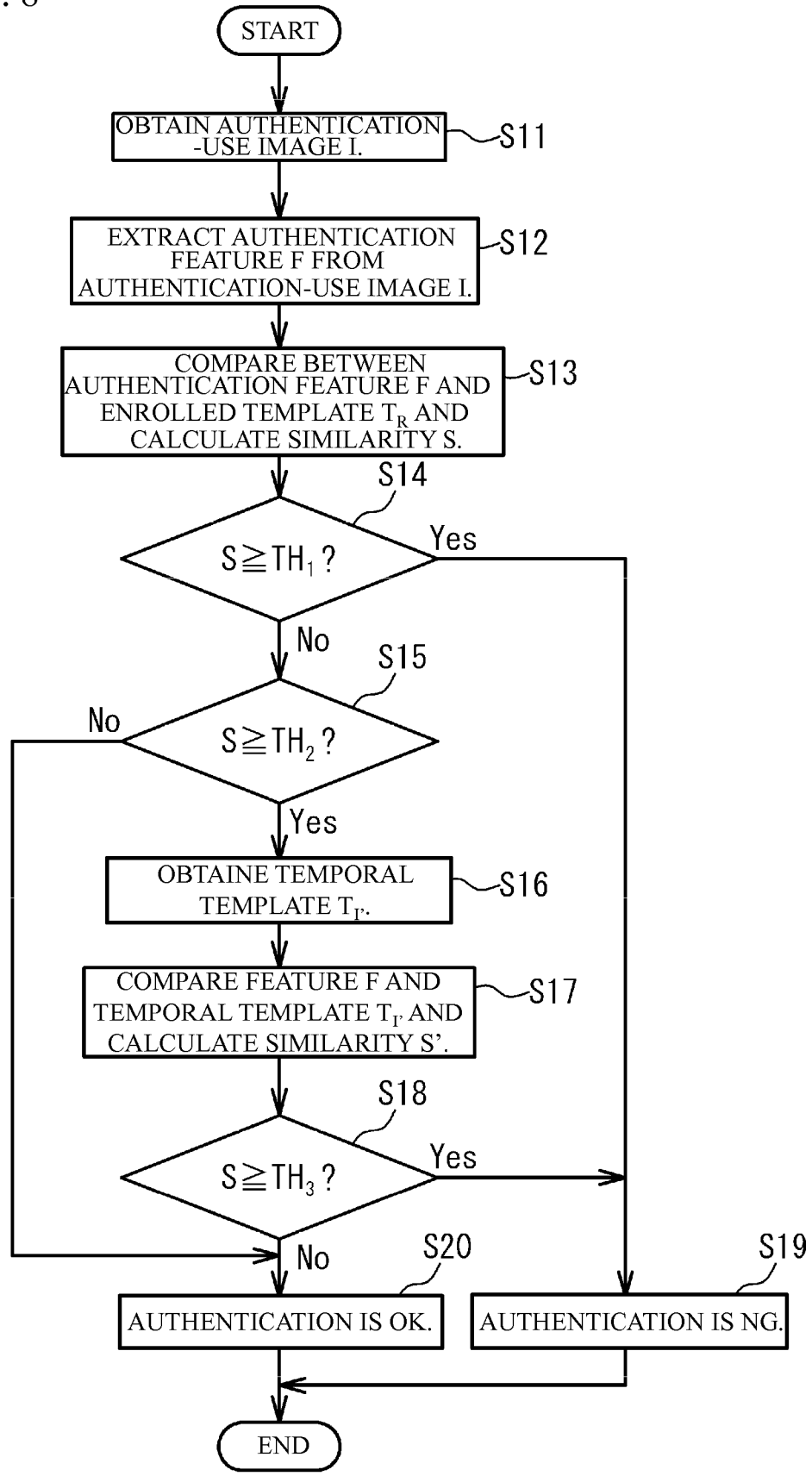
FIG. 8 illustrates an example of a flowchart executed during an authentication process with use of a biometric sensor.

FIG. 8 illustrates an example of a flowchart executed during an authentication process with use of the second biometric sensor 204. The authentication process is performed after the authentication with use of the first biometric sensor 104 is successful, and is, for example, performed during a BIOS authentication at a PC starting, a log-on authentication of an OS, or the like after entering an office. The imaging process unit 22 obtains an authentication-use palm image I from the second biometric sensor 204 (Step S11). Next, the authentication process unit 23 extracts an authentication feature F from the palm image I (Step S12). Next, the authentication process unit 23 compares between the authentication feature F and an enrolled templates $T_R$ which the template obtain unit 24 obtains from the enrollment database 30, and calculates a similarity S of the both (Step S13).

Next, the authentication process unit 23 determines whether the similarity S is equal to or more than a threshold $TH_1$ (Step S14). When it is determined as "No" in the Step S14, the authentication process unit 23 determines whether the similarity S is equal to or more than a threshold $TH_2$ ($<TH_1$) (Step S15). When it is determined as "Yes" in the Step S15, the template obtain unit 24 obtains a temporal template $T_{I'}$ from the template cash unit 5 (Step S16).

Next, the authentication process unit 23 compares the authentication feature F and the temporal template $T_{I'}$ and calculates a similarity S' of the both (Step S17). Next, the authentication process unit 23 determines whether the similarity S' is equal to or more than a threshold $TH_3$ (Step S18). When it is determined as "Yes" in the Step S18 or it is determined as "Yes" in the Step S14, the authentication process unit 23 outputs a signal indicating that the authentication is successful (Step S19). When it is determined as "No" in the Step S18 or it is determined as "No" in the Step S15, the authentication process unit 23 outputs a signal indicating that the authentication is failed (Step S20). After the Step S19 or the Step S20, the execution of the flowchart of FIG. 8 is terminated.

In the embodiment, it is possible to use biometric information allowing successful of an authentication obtained by the first biometric sensor 104 of which reproducibility is high during an authentication based on biometric information obtained by the second biometric sensor 204 of which reproducibility is low. Therefore, biometric information having high reliability can be used. Accordingly, it is possible to suppress degradation of authentication accuracy with use of the second biometric sensor 204. And, degradation of convenience may be suppressed. High reproducibility is not required for the second biometric sensor 204 because the biometric information having high reliability can be used. Therefore, an inexpensive device can be used as the second biometric sensor 204. And, the cost can be suppressed.

When a plurality of biometric sensors are provided, there may be a case where an enrolled templates is needed for each of the biometric sensors. This is because influence on the authentication accuracy is large because a sensor having low image quality is largely subjected to influence of a slight posture changing of a subject (palm or the like). In contrast, in the embodiment, it is possible to use a temporal template based on biometric information allowing successful of the authentication. Therefore, it is not necessary to individually make an enrolled template with respect to each biometric sensor. Accordingly, an amount of the enrolled templates can be reduced.

In the embodiment, it is possible to estimate a factor of a failure of an authentication by the second biometric sensor 204. In concrete, when an image having high image quality obtained by the first biometric sensor 104 is used, a factor of the failure of authentication can be estimated. First, there may be a case where time passes from the enrollment of the enrolled template $T_R$ in the enrollment database 30 to an actual authentication process. In this case, (1) changing of biometric body itself, (2) changing unique to a comparing such as changing of a posture or a noise, and so on are factors of the failure of authentication. Influence of a wound of a surface or the like may be a factor of (1). On the other hand, the factor of (1) is hardly included in a high image quality image obtained on the day. Therefore, it is possible to predict a factor of a failure of authentication by comparing a high image quality image obtained by the first biometric sensor 104 on the day (or in a very short time interval) and an image obtained by the second biometric sensor 204.

Figure 9:
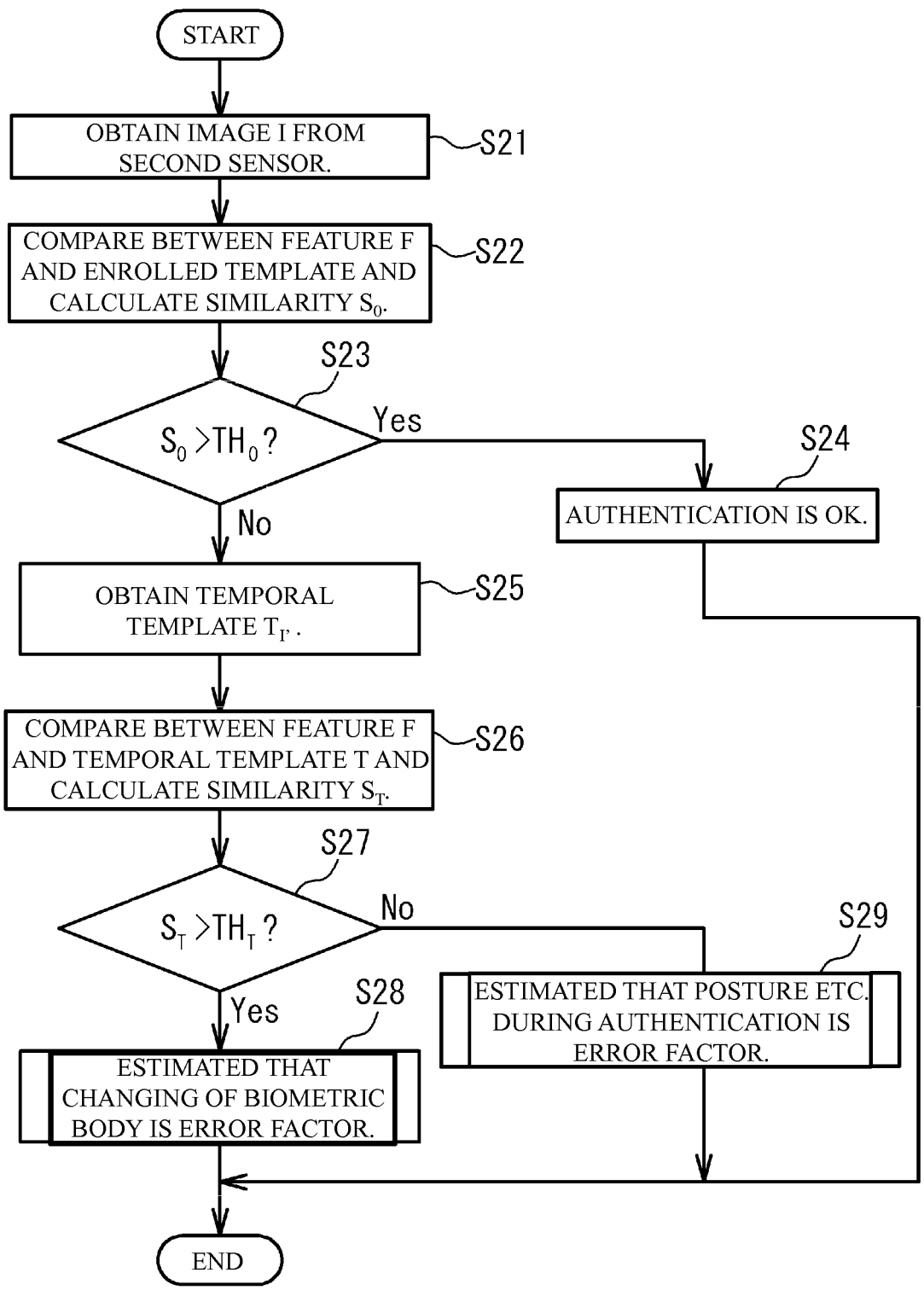
FIG. 9 illustrates an example of a process flow for estimating a factor of a failure of an authentication.

FIG. 9 illustrates an example of a process flow for estimating a factor of a failure of authentication. With reference to FIG. 9, the imaging process unit 22 obtains an authentication-use palm image I from the second biometric sensor 204 (Step S21). Next, the authentication process unit 23 compares the authentication feature F extracted from the palm image I and an enrolled template $T_R$ which the template obtain unit 24 obtains from the enrollment database 30 and calculates a similarity $S_0$ of the both (Step S22).

Next, the authentication process unit 23 determines whether the similarity $S_0$ is equal to or more than the threshold $TH_0$ (Step S23). When it is determined as "Yes" in the Step S23, the authentication process unit 23 outputs a signal indicating that the authentication is successful (Step S24). When it is determined as "No" in the Step S23, the template obtain unit 24 obtains a temporal template TI' from the template cash unit 25 (Step S25).

Next, the authentication process unit 23 compares between the authentication feature F and the temporal template $T_{I'}$ and calculates a similarity $S_T$ of the both (Step S26). Next, the authentication process unit 23 determines whether the similarity $S_T$ is equal to or more than a threshold $TH_T$ (Step S27). When it is determined as "Yes" in the Step S27, the authentication process unit 23 estimates that a changing of a biometric body is an error factor and makes the display device 205 show the estimation (Step S28). When it is determined as "No" in the Step S27, the authentication process unit 23 estimates that a posture of the biometric body or the like during the authentication is the failure of authentication and makes the display device 205 show the estimation (Step S29).

In accordance with the flowchart of FIG. 9, when the authentication with use of the second biometric sensor 204 is failed, a comparing between the authentication feature F and the temporal template $T_{I'}$ is performed. When similarity of this case is high, it is estimated that a changing occurs in a biometric feature, because although similarity between the temporal template $T_{I'}$ and the authentication feature F is high, similarity between an enrolled template enrolled previously and the authentication feature F is low. In this case, a correct determination can be performed by performing an image process for reducing the difference between image qualities of sensors.

Another Example

Figure 10:
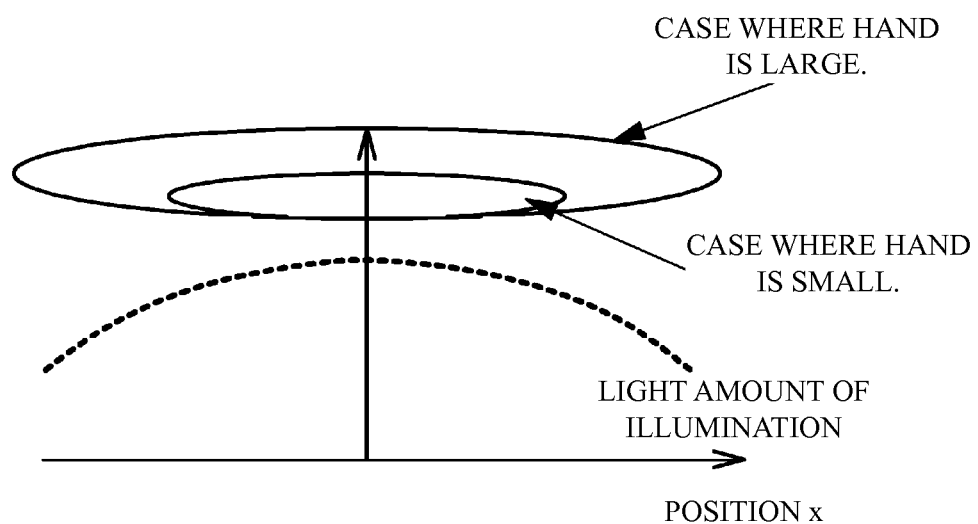
FIG. 10 illustrates influence of hand size on limb darkening.

In the above-mentioned embodiments, the structure in which a temporal template is generated with respect to all users is described. However, the structure is not limited. For example, the generation of the temporal templates may be valid or invalid with respect to each user. For example, with reference to FIG. 10, the limb darkening has large influence on a person having a large hand but the limb darkening has little influence on a person having a small hand. Therefore, when the generation of the temporal template is suppressed with respect to the user having a small hand, the imaging process achieves an effect of reducing CPU burden, reducing power consumption and reducing storage capacity.

Influence degree of surface reflection differs with respect to an individual. This is because a shape of a palm differs with respect to an individual although the surface reflection is largely subjected to influence of an incident angle and a reflection angle of a light. Therefore, there is a user that is largely subjected to influence of the surface reflection and a user that is not largely subjected to the influence of the surface reflection. When a process of adding surface reflection is applied to a specific user who is largely subjected to the surface reflection, the above-mentioned effect is achieved.

In the case of the surface reflection, it is difficult to determine with or without applying during enrollment, being different from a size of a hand. This is because, the influence of the surface reflection depends on a holding condition of a palm and it is difficult to determine only from image data of few times during an enrolling. And so, with or without applying may be determined according to a history of the authentication result. That is, a rate of a failure of authentication for a given time or a given times may be searched. When the rate of the failure of authentication is more than a predetermined value, image quality of an image of a case where an authentication with use of the biometric sensor 104 is successful may be degraded and a temporal template may be generated.

In the above-mentioned embodiments, the cases in which an image that is obtained by the first biometric sensor 104 and is processed is used for an authentication with use of the second biometric sensor 204 are descried. However, the embodiments are not limited. For example, a fusion score (total similarity) in which a similarity $S_R$ between an authentication feature F extracted from an image I obtained by the second biometric sensor 204 and an enrolled template $T_R$ and a similarity $S_T$ between the authentication feature F and the temporal template $T_{I'}$ are combined may be used. For example, a total similarity $S_{TOTAL}$ may be calculated in accordance with the following formula (4).

$$S_{TOTAL}=(1.0-w)S_R+wS_T \quad (4)$$

Figure 11:
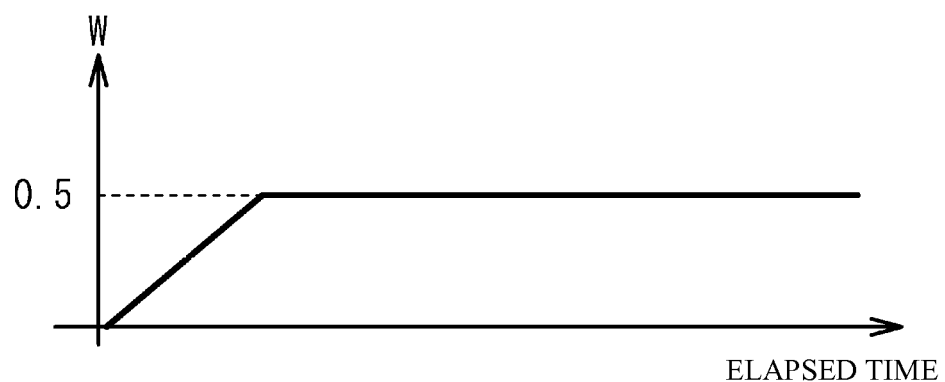
FIG. 11 illustrates a fusion score.

In the above formula (4), "w" is a coefficient indicating a weight of each similarity. Just after enrollment of an enrolled template $T_R$, a difference between the enrolled template $T_R$ and the temporal template $T_{I'}$ is small. On the other hand, as time passes, the difference between the enrolled template $T_R$ and the temporal template $T_{I'}$ gets larger. Therefore, "w" may be small just after the enrollment, and "w" may be enlarged as time passes. In the example of FIG. 11, an upper limit value (0.5) is set in the "w".

The number of type of a biometric sensor having low reproducibility is not always one. For example, there may be a case where a plurality of biometric sensors having low image quality are provided. For example, it is assumed that a biometric sensor 204a and a biometric sensor 204b are provided. In this case, a plurality of factors are mixed as a degradation factor of image quality. For example, it is possible that reduction of MTF is a degradation factor of the biometric sensor 204a, and reduction of MTF and a noise are two degradation factors of the second biometric sensor 204b. This may occur when although the biometric sensors 204a and 204b use a common lens, the biometric sensors 204a and 204b have a different imaging element.

In this case, when the temporal template $T_{I'}$ is generated from an image obtained by the first biometric sensor 104, processes may be streamlined by sequentially applying the processes. In concrete, first, a temporal template T1 in which a MTF degradation process is applied may be generated, and the temporal template T1 may be used in an authentication with use of the biometric sensor 204a. Sequentially, a temporal template T2 in which a noise adding process is applied to the temporal template T1 may be generated, and the temporal template T2 may be used in an authentication with use of the biometric sensor 204b. In this manner, it is possible to streamline the processes more than generating each image for each sensor.

Second Embodiment

In the first embodiment, the case where each terminal performs an authentication process is described. However, an authentication server may perform the authentication process. For example, a high image quality sensor is used for entrance to a country, and a low image quality sensor is used for identity check after the entrance to the country. In this case, the authentication server solely performs the authentication process.

Figure 12:
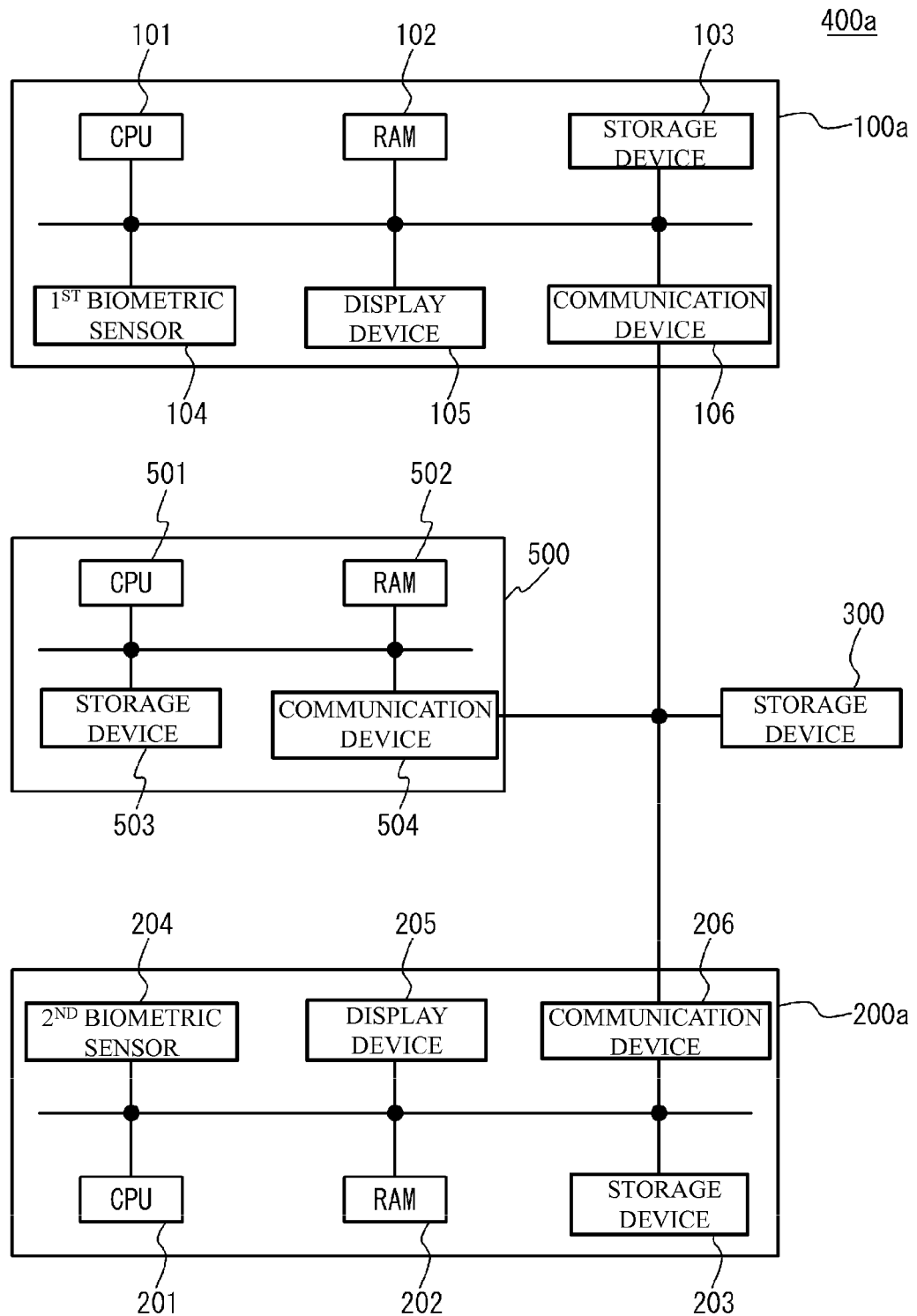
FIG. 12 illustrates a block diagram for describing a hardware structure of a biometric authentication device in accordance with a second embodiment.

FIG. 12 illustrates a block diagram for describing a hardware structure of a biometric authentication device 400a in accordance with a second embodiment. With reference to FIG. 12, the biometric authentication device 400a has a structure in which a terminal 100a, a terminal 200a, the storage device 300 and a server 500 are coupled with each other via a network. The terminal 100a is, for example, a device performing an authentication of entrance to a country. The terminal 200a is, for example, a terminal used for identity check after entrance to the country. The server 500 is a sole authentication server that performs authentication processes.

The terminal 100a has the CPU 101, the RAM 102, the storage device 103, the first biometric sensor 104, the display device 105, the communication device 106 and so on. These components are coupled with each other via a bus or the like. The terminal 200a has the CPU 201, the RAM 202, the storage device 203, the second biometric sensor 204, the display device 205, the communication device 206 and so on. These components are coupled with each other via a bus or the like. The server 500 has a CPU 501, a RAM 502, a storage device 503, a communication device 504 and so on. These components are coupled with each other via a bus or the like.

The CPU 501 is a central processing unit. The RAM 502 is a volatile memory temporally storing a program executed by the CPU 501, a data processed by the CPU 501, and so on. The storage device 503 is a nonvolatile memory device. The communication devices 504 is an interface for transmitting and receiving a signal with an outer component. The storage device 300 is a nonvolatile memory device and stores the biometric authentication program. The biometric authentication program may be divided into and stored by the storage devices 103. 203 and 503.

Next, a description will be given of each process of the biometric authentication device 400a. The biometric authentication program stored in the storage device 300 is developed to the RAMs 102. 202 and 502. The CPU 101 executes the biometric authentication program developed to the RAM 102. The CPU 201 executes the biometric authentication program developed to the RAM 202. The CPU 501 executes the biometric authentication program developed to the RAM 502. Thus, each process of the biometric authentication device 400a is performed.

Figure 13:
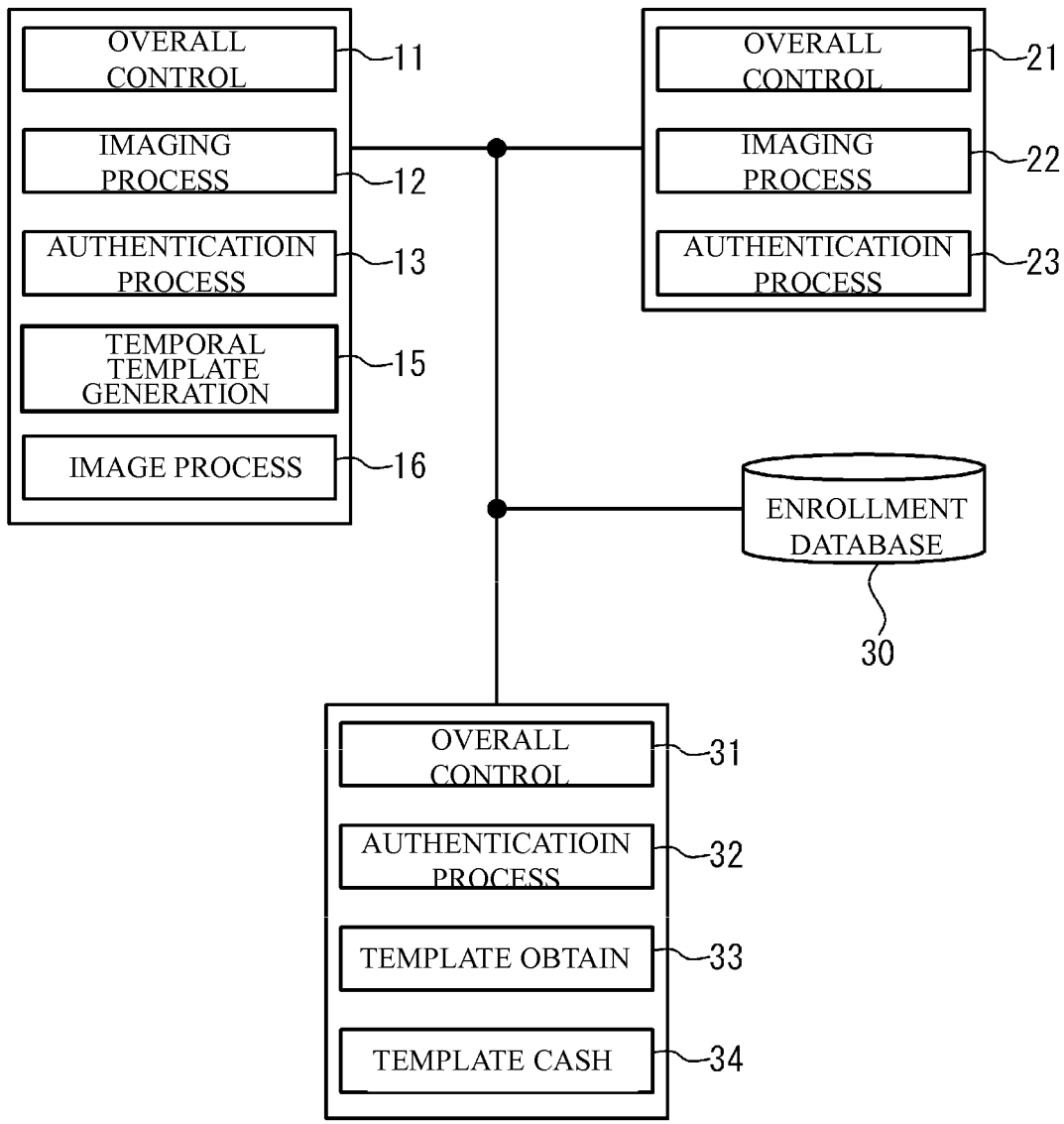
FIG. 13 illustrates a block diagram of each function realized by an execution of a biometric authentication program.

FIG. 13 illustrates a block diagram of each function realized by the execution of the biometric authentication program. With reference to FIG. 13, by the execution of the biometric authentication program, the terminal 100a acts as the overall control unit 11, the imaging process unit 12, the authentication process unit 13, the temporal template generation unit 15 and the image process unit 16. By the execution of the biometric authentication program, the terminal 200a acts as the overall control unit 21, the imaging process unit 22 and the authentication process unit 23. And, by the execution of the biometric authentication program, the storage device 300 acts as the enrollment database 30. And, by the execution of the biometric authentication program, the server 500 acts as an overall control unit 31, an authentication process unit 32, a template obtain unit 33 and a template cash unit 34.

In the embodiment, the authentication process unit 13 extracts an authentication feature from a palm image obtained by the biometric sensor 104, and transmits the biometric authentication feature to the server 500 without performing an authentication process. The authentication process unit 23 extracts an authentication feature from a palm image obtained by the second biometric sensor 204 and transmits the authentication feature to the server 500 without performing an authentication process.

The overall control unit 31 controls the authentication process unit 32, the template obtain unit 33 and the template cash unit 34. The authentication process unit 32 performs an authentication process with use of the authentication features transmitted from the authentication process unit 13 and the authentication process unit 23 in accordance with an instruction of the overall control unit 31. The template obtain unit 33 obtains a template from the enrollment database 30 for an authentication of the authentication process unit 32. The template cash unit 34 temporarily stores a template generated by the temporal template generation unit 15.

[Authentication Process]

Figure 14:
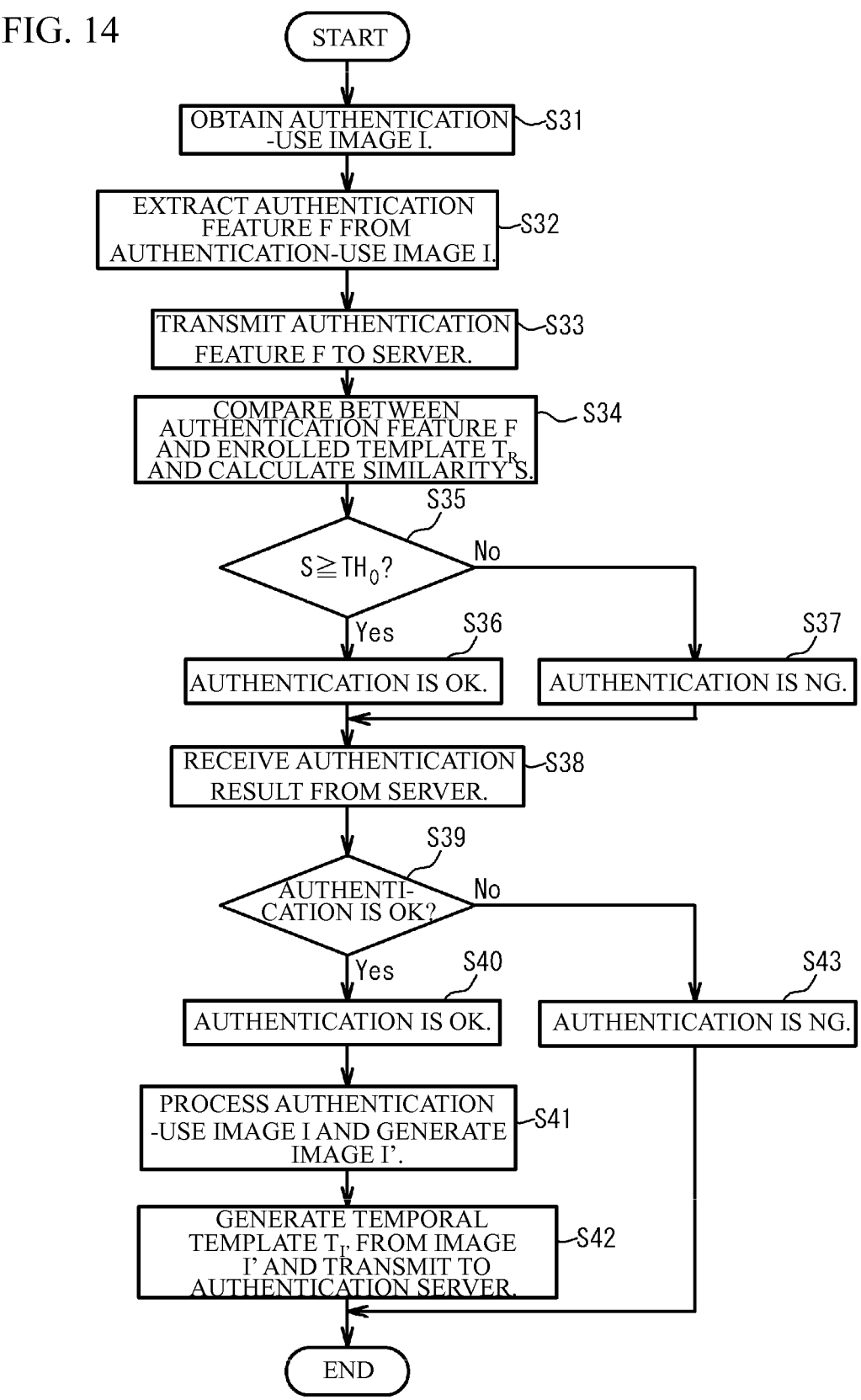
FIG. 14 illustrates an example of a flowchart executed during an authentication process with use of a biometric sensor.

FIG. 14 illustrates an example of a flowchart executed during an authentication process with use of the biometric sensor 104. The authentication process is performed during entrance to a country or the like. The imaging process unit 12 obtains an authentication-use palm image I from the biometric sensor 104 (Step S31). Next, the authentication process unit 13 extracts an authentication feature F from the palm image I (Step S32). Next, the authentication process unit 13 transmits the authentication feature F to the server 500 (Step S33).

Next, the authentication process unit 32 compares between the authentication feature F and an enrolled template $T_R$ which the template obtain unit 33 obtains from the enrollment database 30, and calculates a similarity S of the both (Step S34). Next, the authentication process unit 32 determines whether the similarity S is equal to or more than the threshold $TH_0$ (Step S35). When it is determined as "Yes" in the Step S35, the authentication process unit 32 outputs a signal indicating that the authentication is successful (Step S36). When it is determined as "No" in the Step S35, the authentication process unit 32 outputs a signal indicating that the authentication is failed (Step S37).

The authentication process unit 13 receives the authentication result from the authentication process unit 32 (Step S38). The authentication process unit 13 determines whether the received authentication result indicates successful (Step S39). When it is determined as "Yes" in the Step S39, the authentication process unit 13 outputs a signal indicating that the authentication is successful (Step S40). Next, the image process unit 16 processes the palm image I and generates an image I' of which image quality is lower than the image I (Step S41). Next, the authentication process unit 13 extracts an authentication feature from the image I', and the temporal template generation unit 15 transmits the authentication feature to the server 500 as a temporal template $T_{I'}$ (Step S42). When it is determined as "No" in the Step S39, the authentication process unit 13 outputs a signal indicating that the authentication is failed (Step S43). After the Step S42 or the Step S43, the flowchart of FIG. 14 is terminated.

Figure 15:
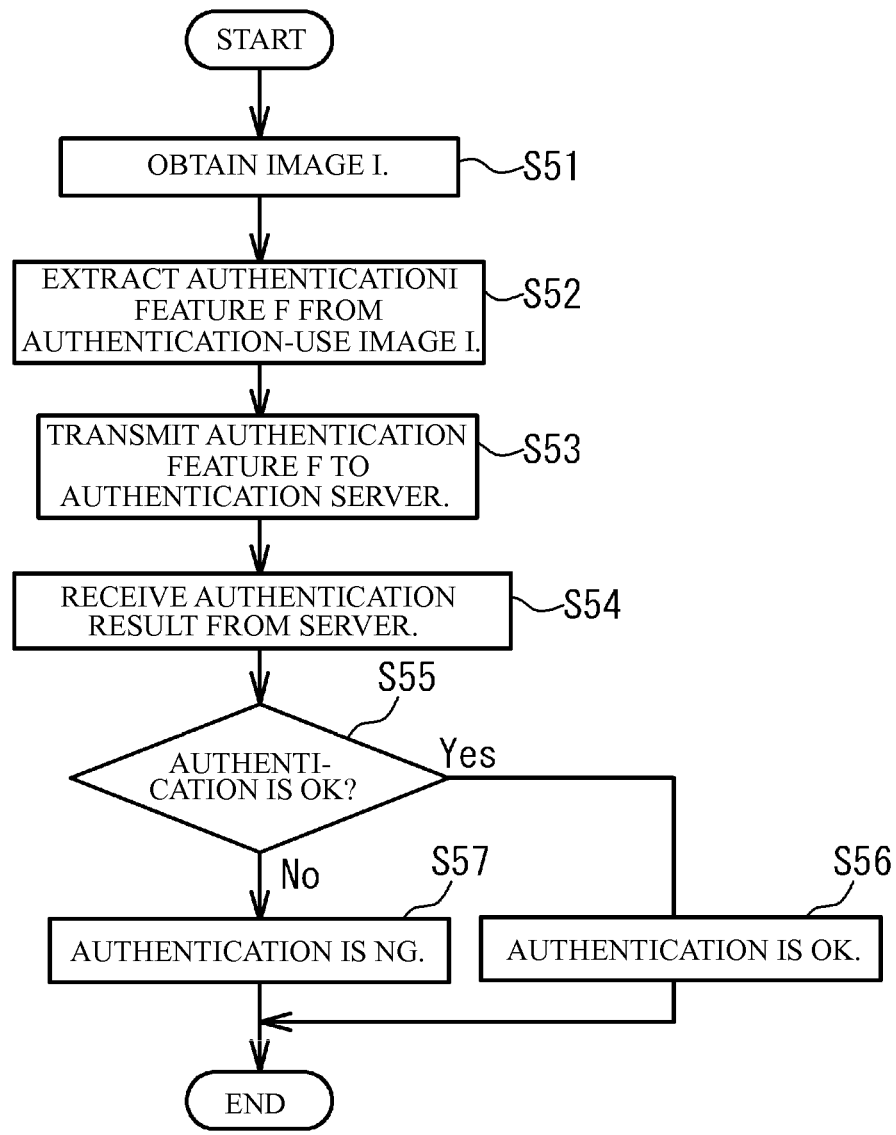
FIG. 15 illustrates an example of a flowchart executed during an authentication process with use of a second biometric sensor.

FIG. 15 illustrates an example of a flowchart executed during an authentication process with use of the second biometric sensor 204. The authentication process is performed after the authentication process with use of the first biometric sensor 104 is successful, and is, for example, performed during an identity check after the entrance to the country. The imaging process unit 22 obtains an authentication-use palm image I from the second biometric sensor 204 (Step S51). Next, the authentication process unit 23 extracts an authentication feature F from the palm image I (Step S52). Next, the authentication process unit 23 transmits the authentication feature F to the server 500 (Step S53). Next, the authentication process unit 23 receives an authentication result from the server 500 (Step S54).

Next, the authentication process unit 23 determines whether the received authentication result is successful (Step S55). When it is determined as "Yes" in the Step S25, the authentication process unit 23 outputs a signal indicating that the authentication is successful (Step S56). When it is determined as "No" in the Step S55, the authentication process unit 23 outputs a signal indicating that the authentication is failed (Step S57). After the Step S56 or the Step S57, the flowchart of FIG. 15 is terminated.

Figure 16:
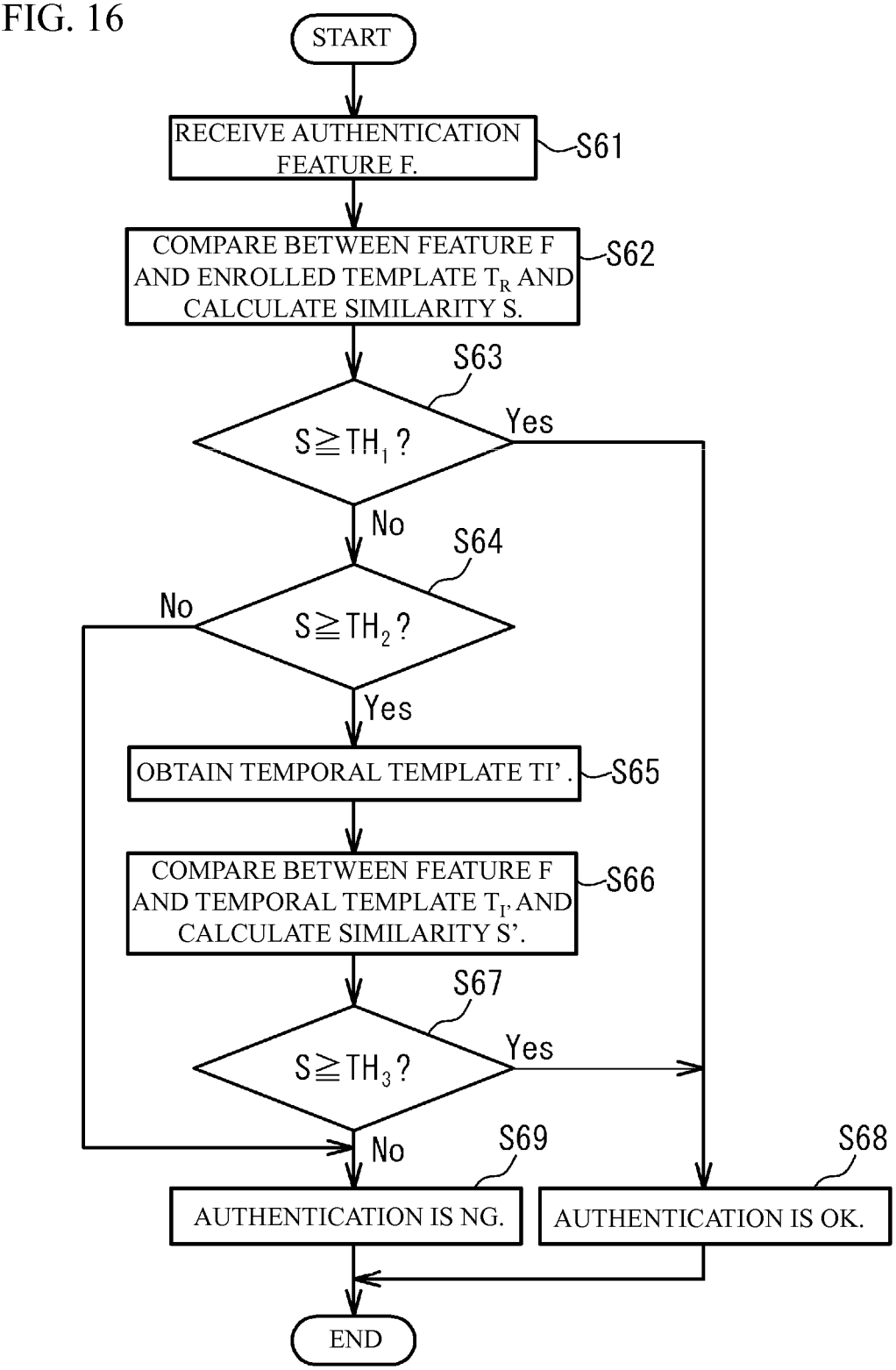
FIG. 16 illustrates an example of a flowchart executed by a server after a Step S53 of FIG. 15.

FIG. 16 illustrates an example of a flowchart executed by the server 500 after the Step S53 of FIG. 15. With reference to FIG. 16, the authentication process unit 32 receives an authentication feature F from the authentication process unit 23 (Step S61). Next, the authentication process unit 32 compares between the authentication feature F and an enrolled template $T_R$ which the template obtain unit 33 obtains from the enrollment database 30, and calculates a similarity of the both (Step S62).

Next, the authentication process unit 32 determines whether the similarity S is equal to or more than a threshold $TH_1$ (Step S63). When it is determined as "No" in the Step S63, the authentication process unit 32 determines whether the similarity S is equal to or more than a threshold $TH_2$ ($<TH_1$) (Step S64). When it is determined as "Yes" in the Step S64, the template obtain unit 33 obtains a temporal template $T_{I'}$ from the template cash unit 34 (Step S65).

Next, the authentication process unit compares the authentication feature F and the temporal template $T_{I'}$ and calculates a similarity S' of the both (Step S66). Next, the authentication process unit 32 determines whether the similarity S' is equal to or more than a threshold $TH_3$ (Step S67). When it is determined as "Yes" in the Step S67 or it is determined as "Yes" in the Step S64, the authentication process unit 32 returns a signal indicating that the authentication is successful to the terminal 200a (Step S68). When it is determined as "No" in the Step S64 or when it is determined as "No" in the Step S67, the authentication process unit 32 returns a signal indicating that the authentication is failed to the terminal 200a (Step S69). After the Step S19 or the Step S20, the execution of the flowchart of FIG. 15 is terminated.

In the embodiment, it is possible to use biometric information allowing successful of an authentication obtained by the first biometric sensor 104 of which reproducibility is high during an authentication based on biometric information obtained by the second biometric sensor 204 of which reproducibility is low. Therefore, biometric information having high reliability can be used. Accordingly, it is possible to suppress degradation of authentication accuracy with use of the second biometric sensor 204. And, degradation of convenience may be suppressed. High reproducibility is not required for the second biometric sensor 204 because the biometric information having high reliability can be used. Therefore, an inexpensive device can be used as the second biometric sensor 204. And, the cost can be suppressed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A biometric authentication device comprising:
   a first biometric sensor that obtains biometric information of a user;
   a second biometric sensor that obtains biometric information of a user at a lower degree of reproducibility than the first biometric sensor;
   an authentication process unit that performs an authentication by comparing with use of the biometric information obtained by the first biometric sensor and the second biometric sensor,
   wherein the authentication process unit compares biometric information obtained by the second biometric sensor with use of biometric information obtained by the first biometric sensor of a case where a comparing between the biometric information obtained by the first biometric sensor and enrolled information is successful.

2. The biometric authentication device as claimed in claim 1 further comprising:
   a process unit that processes the biometric information obtained by the first biometric sensor of the case where the comparing between the biometric information and the enrolled information is successful,
   wherein the authentication process unit performs an authentication by comparing a processed biometric information processed by the process unit and the biometric information obtained by the second biometric sensor.

3. The biometric authentication device as claimed in claim 2, wherein the authentication process unit performs an authentication by comparing the processed biometric information and the biometric information obtained by the second biometric sensor when the comparing between the biometric information obtained by the second biometric sensor and the enrolled information is failed.

4. The biometric authentication device as claimed in claim 2, wherein:
the first biometric sensor and the second biometric sensor are sensors that obtain a biometric image; and
the process unit performs a process of lowering image quality of the biometric image obtained by the first biometric sensor.

5. The biometric authentication device as claimed in claim 1, wherein the authentication process unit reflects a result of the comparing between the biometric information obtained by the second biometric sensor and the enrolled information to the comparing between the biometric information obtained by the second biometric sensor and the biometric information obtained by the first biometric sensor of the case where the comparing between the biometric information obtained by the first biometric sensor and the enrolled information is successful.

6. A biometric authentication method comprising:
performing an authentication by comparing biometric information obtained by a first biometric sensor that obtains biometric information of a user and an enrolled information; and
with use of the biometric information of a case where the comparing is successful, performing an authentication by comparing biometric information obtained by a second biometric sensor that obtains biometric information of a user at a lower degree of reproducibility than the first biometric sensor.

7. A computer readable, non-transitory medium storing a program that causes a computer to execute a process, the process comprising:
performing an authentication by comparing biometric information obtained by a first biometric sensor that obtains biometric information of a user and an enrolled information; and
with use of the biometric information of a case where the comparing is successful, performing an authentication by comparing biometric information obtained by a second biometric sensor that obtains biometric information of a user at a lower degree of reproducibility than the first biometric sensor.

* * * * *